May 19, 1936.  J. L. TAYLOR  2,041,218
FLEXIBLE SHAFT COUPLING
Filed Sept. 26, 1931

INVENTOR:
John Leonard Taylor.
BY:
ATTORNEY.

Patented May 19, 1936

2,041,218

UNITED STATES PATENT OFFICE 2,041,218

FLEXIBLE SHAFT COUPLING

John Leonard Taylor, Milwaukee, Wis.

Application September 26, 1931, Serial No. 565,281

12 Claims. (Cl. 64—14)

This invention relates to improvements in flexible shaft couplings, or similar apparatus particularly of a nature such that shocks or other stresses may affect the relation existing between a driving element and the mechanism driven thereby.

An object of the invention is to generally improve the construction and operation of apparatus of this class.

A further object is to provide such a coupling which will require only a minimum of space.

Further objects are to provide the following:

Such a coupling which will provide a desired amount of resiliency in connecting one shaft or element with another;

Such a coupling which will minimize the transmission of shocks therethrough;

Such a coupling which will permit misalignment of the joined elements, both angularly, and eccentrically;

Such a coupling which may be assembled or repaired in locations characterized by a lack of space;

Such a structure including sub-assemblies replaceable as units for facilitating assembly, repair etc. of the coupling;

More particularly an object is to provide a coupling characterized by juxtaposed disks between portions of which are extended flexible driving elements, there being sufficient freedom between the parts to permit the misalignment aforesaid.

A further object is to provide such a structure in which the flexible elements are disposed between cam surfaces arranged to change the effective flexibility characteristics of the elements as distortion occurs.

A further object is to provide cam elements of this nature assembled with such flexible elements, the assemblies being movable and replaceable as units in the complete coupling.

A further object is to provide such a coupling in which the flexible elements are fixed at one end with one disk, but free to move relatively to the other disk to provide the necessary freedom for distortion of the flexible elements while insuring correct positioning of the elements relatively to the disks at all times.

A further object is to provide such a structure in which the resistance to distortion of the flexible elements increases with the increase in load, approaching as a limit the shearing strength of the flexible elements.

Further objects and advantages will appear from the following specification and accompanying drawing in which.

Figures 1, 2:
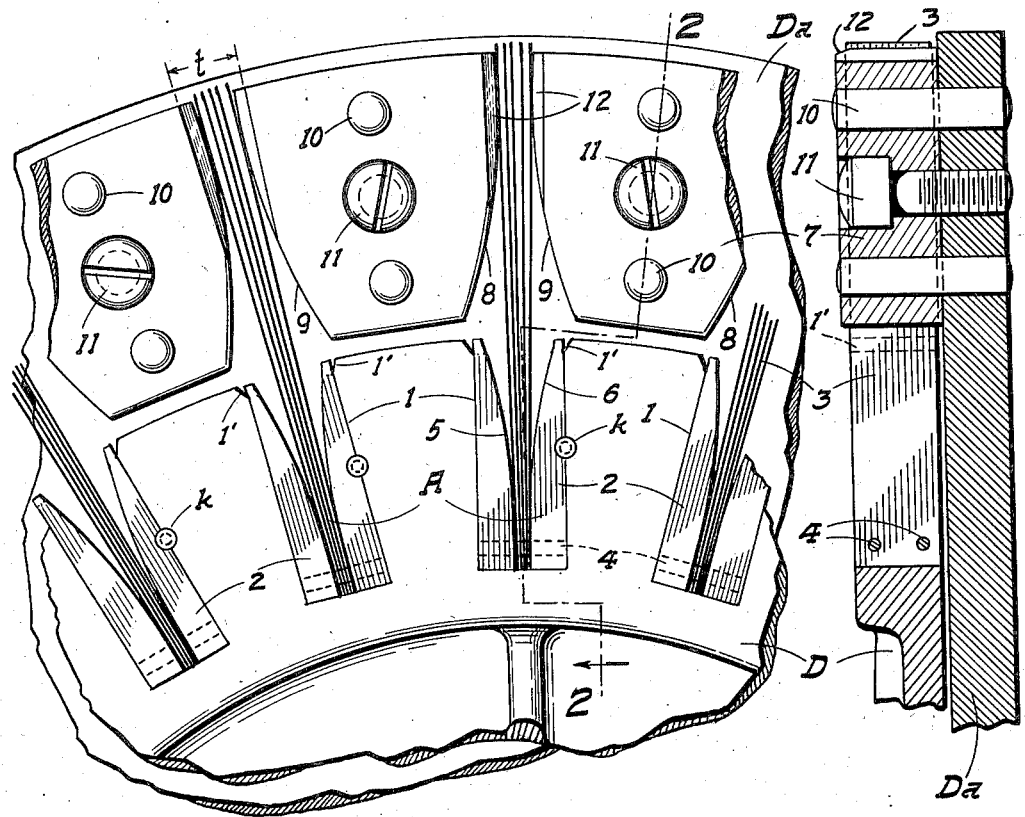
Fig. 1 is a fragmentary face view of disc elements employed in the structure here concerned.
Fig. 2 is a section on line 2—2 of Fig. 1.
Figure 3:
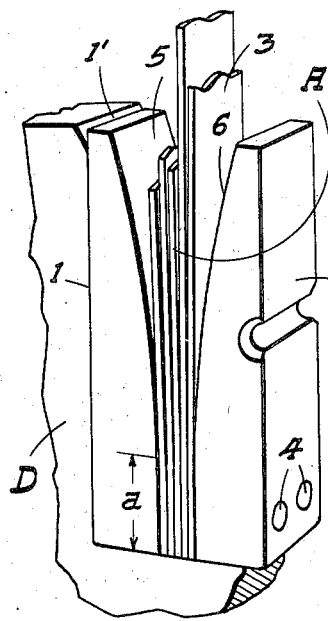
Fig. 3 is a perspective view of a sub-assembly forming an essential part of this invention.

Referring to the drawing, the reference character D indicates a driving disc which is suitably mounted to rotate with its drive-shaft S. The coupling here concerned need not be limited to shafts only; there are other adaptations within the art's scope. The driving and driven relationship in the present instance, is assumed to begin with the disc D as the driver, however, a vice versa, application of the power at hand may obtain within the contemplation of the invention. The said disc D flexibly interlocks with a normally concentric disc Da which latter is suitably keyed to its driven shaft S'. Both discs are arranged to rotate in parallel adjacent planes with, however, a permissible departure from such parallelism when there occur variations in shaft alignment, comprising either lateral displacement of one of the shafts or angular deviation of one of the shafts from the common axis, or both. The present invention is of value as an efficient coupling intermediate separate rotative assemblies of importance in safeguarding the mechanism against shocks experienced in encountering a load met when starting an assembly previously at rest with a power transmitting rotative means, and in cushioning these shocks and thereafter cushioning load variations met during operating periods. In order to provide shock-absorbing means that will effectively function for the conditions contended with in the field concerned, and to conserve space for allowing, when necessary, convenient coupling within a short axial space, the disc forms of driving and driven elements have been chosen with certain novel improvements intended for increasing manufacturing economy, flexibility, replacement convenience, and facility of installation inside of, as well as outside of, associated apparatus.

The disc D is formed to provide radial slots 1 wherein are fitted, preferably flush with the disc's faces, sub-assemblies A, which comprise opposed blocks 2 between which are clamped, in laminated arrangement, flexible blades 3. The blocks 2 and blades 3 in the present instance are held together by dowels 4. The said assembly A is then pressed into the slots 1 of the disc D and held against shifting, after inserting the blocks, by drilling and countersinking for a rod-key or equivalent means $k$ which latter is then peened or headed at each end or otherwise fixed in place. The blades 3 and one of the blocks 2 will be drilled to offer a drive-fit for the dowels 4, while the companion block will be drilled for a snug slip-fit for said dowels. This latter provision will allow for accurately fitting the aforesaid sub-assemblies in their respective slots without much labor, which only requires that the area $a$ of the removable block 2 be ground, to reduce the root thickness of A, or a thicker blade be substituted for increasing said thickness. The slots 1 are very likely to be of accurate and uniform widths, but in the event that unavoidable variations obtain in the gauge-thickness of blades 3, correct fitting may be accomplished in the above manner. The sub-assembly A is assisted into the slots 1 by chamfering the slot's entrance corners 1'. The blocks 2 are formed to provide spaces between them which flare outwardly beyond the clamping area $a$ leaving the blades 3 radially extending between curved cam surfaces 5 and 6.

Figure 4:
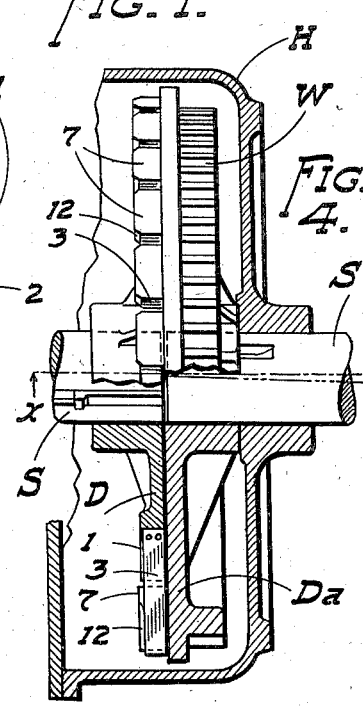
Fig. 4 is a sectional elevation of a flexible coupling, as here concerned, within a conventional housing frequently present in engine adaptations.

About the disc D, and in the vertical plane thereof, occur annularly arranged blocks 7, fixedly but in the present instance replaceably attached to the face of disc D$a$ in separated relation so as to leave the spaces between them, normally, coincident to the spaces between the blocks 2—2 extended. The said blocks 7 are curved to provide spaces which flare inwardly to provide blade-flexing room intermediate cam surfaces 8 and 9, the latter forming curves that are respectively complimentary to the surfaces 6 and 5. The blocks 7 are held in their determined positions on the disc D$a$ by any suitable means, but in the present illustrative embodiment by locating dowels 10 and screws 11. The blocks 7 are preferably chamfered at 12 to provide easy blade entrance into the spaces which will always exceed the outer spread of blades here indicated at $t$, especially when assembling of the discs occurs in unhandy places, such as is shown in Fig. 4 where the disc D$a$ is an integral element of an engine fly-wheel W located within a closely fitting housing H where it would be otherwise difficult to align the blades with their respective spaces. The aforesaid chamfers 12 do not reduce the blade-contacting surfaces 8 and 9 since these faces are a trifle wider than the blades 3 so that the discs D—D$a$ may rotate at a slight angle to each other when their respective shafts, or axes, happen to be misaligned as indicated by the axis X$a$ with respect to the true center-line X in Fig. 4.

Figure 5:
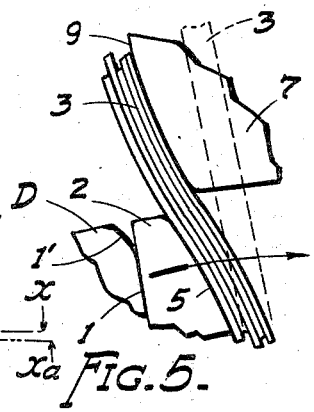
Fig. 5 is a fragmentary detail illustrating certain aspects of a flexible element here employed.

The concentric relation of the discs D and D$a$ can vary into what would be regarded as an allowable eccentric relation, due to an annular gap between the disc D and the inner circle of the blocks 7. The said gap forms the circle about which the blades 3 symmetrically flex. The flexing area of the blade laminations extends from the normal radial position of Fig. 1 to the extreme position shown in Fig. 5 with respect to the rotative direction indicated by the arrow. The opposite condition will be obvious with reverse rotation.

The employment of blocks 2, having the curved faces 5 and 6, and the abutment blocks 7, having the opposedly arranged faces 8 and 9, provides spaces wherein the blades find ample room to lend their cushioning quality, as locking key-like elements, bridging the peripheral gap between disk D and blocks 7. The transition from normal to ultimate blade position is gradually reached under increase of load to sufficiently high values, and also if load conditions vary sufficiently during operation, but normal loads are ordinarily carried without flexing the blades to the extreme position shown in Fig. 5. The spaces offer a generous area within which the blade assembly 3 will be free to flex between the full line position 3 and the dotted position 3 of Fig. 5. With the oppositely disposed and flared spaces between the outer blocks 7 and the inner blocks 2, due to the complementary or tangentially alignable curvature of their cam surfaces 5—6, 8—9, the power transmitting action, upon progressive increase of load, is a gradual approach towards what may be called the blade's shear-point, a condition which can be suddenly reached under extreme stress without any fatiguing bend being given the blades 3, and wherein the blades may transmit torque up to the limit of their shearing strength. The flexing quality residing in the plural blades is of course predetermined for the expected work to be done. The arrangement chosen establishes an efficiently balanced circumferential cushioning between the aforesaid discs which will be effective over the period of time required in overcoming the inertia of a rotatable body when at rest, and the absorbing of intermittent stresses experienced in the course of operations.

Blocks 2 of different sizes, forming separate sets, are interchangeable with the dowel means here employed, and blades of varying gauge-thickness, or a solid blade, may be introduced as conditions warrant. The rod-keys $k$ can be driven out and re-inserted again with the contemplated construction, because the peening meant here is more of a spreading flare attained by center-punching the rod ends. The blocks 7 may also be exchanged for different size sets. These changes will restrict or enlarge the intervening spaces occuring between blocks 2 and 7, as well as allowing for a modifying of the flexible quality in blade elements 3. Further, the blocks 7 may be padded out so that shafts, farther axially separated than is here shown, may be efficiently coupled up, and any such well known mechanical expedients are contemplated as part of the invention insofar as they are included in the scope of the claims.

The sub-assemblies, and other replaceable units of this invention obviate the costly practice of having to "scrap" major elements because of minor defects. This hardship is now eliminated along with those accompanying "shut-downs" and lengthy interruptions caused by mechanical break-downs which often occur at points where rotative elements are joined together, and, in view of the fact noted, it is here emphasized, the present invention happens to be a mechanical contrivance which is generally installed at a jointure which couples up the larger part of, or perhaps all of, the machinery employed beyond a basic power source. With the greater part of a machinery lay-out depending upon a means such as here considered, it is very essential that interruptions be infrequent, of short duration, and inexpensively cared for if and when they do occur.

The blocks 2 and 7 provide for exceptional manufacturing convenience, in that they may be readily set up and machined, blocks 2 then fitting into slots which may be economically milled or otherwise formed in the disk D, and the blocks 7 being readily fixed with the disk Da, whereas any attempt to machine the curves 5—6 or 8—9 directly in their respective disks would be impracticable and expensive.

Having described the invention what is claimed and desired to protect by United States Letters Patent, is:—

1. In a flexible coupling, the combination of a driving member and a driven member, one of said members being provided with symmetrically arranged substantially radial slots, a group of leaf springs clamped at one end to said member in each slot, the other member being provided with similarly arranged substantially radial slots radially spaced from the first mentioned slots, said groups of springs being engaged at their other ends in the second mentioned slots, said second mentioned slots being relatively wide and having curved cam-walls, and said springs diverging from each other at their free ends to fully occupy said slots when at rest, said curved cam walls progressively shortening the unsupported length of said springs as said springs flex under load, and the radial arrangement of said slots neutralizing any thrust developed in said springs by reason of their engagement with said curved cam walls.

2. In a flexible coupling the combination of a driving member and a driven member, said driving member being provided with a plurality of symmetrically arranged, substantially radial slots, and said driven member being also provided with a plurality of similarly arranged substantially radial slots, the slots of said driving member forming, when said members are assembled in certain positions, continuations of the slots of said driven member, a plurality of resilient members, each extending from a slot in said driving member into a slot in said driven member, and said slots having curved driving faces in contact with said resilient members whereby to avoid localized flexing of said resilient members and to progressively shorten the portion of said members exposed to flexing during progressive increase of load, said resilient members being rigidly clamped between continuations of said curved driving faces, and the radial arrangement of said slots neutralizing any thrust developed in said springs by reason of their engagement with said curved cam walls.

3. In a flexible coupling the combination of a driving member and a driven member, said members being provided with radial slots, those of one member being aligned with those of the other, and resilient bars extending between said members and each engaged in a driving and a driven slot, the slots of one member being formed between spaced removable blocks applied to a face of said member and having cam shaped faces in a direction of movement thereof, the slots of the other member being formed also between spaced removable blocks, also having cam shaped faces in a direction of movement, said resilient bars being each composed of a plurality of spring leaves rigidly clamped at one end between the last mentioned blocks, each set of blocks and leaves constituting a unitary structure, removable and replaceable intact in said member, said leaves diverging at their free ends to insure engagement with both sides of the slots in the other member, said slots being open, in the direction of entrance of said unitary structures into their associated member, and having chamfered corners to facilitate the entrance of said diverging spring leaves into said slots.

4. In a flexible coupling the combination of a driving member and a driven member, one of said members having a plurality of substantially radial slots, and the other member also having a plurality of substantially radial slots, so disposed as to form, generally, continuations of the first mentioned slots when said members are placed together in operative relationship, a plurality of spring bars each engaged at one end in a slot of one member, and clamped and doweled at the other end between a pair of blocks rigidly but removably fixed with the other member, said blocks being so arranged that the spaces between said pairs of blocks constitute the radial slots of said member, said blocks being pressed by engagement with the walls of said slots into clamping relation with said spring bars, and said pairs of blocks, together with their associated springs constituting unitary, easily removable elements of said coupling.

5. In a flexible coupling the combination of a driving member and a driven member, said members being juxtaposed and one of said members having a series of blocks fixed therewith and constituting an annular rim encircling the periphery of the other member, said blocks being spaced to provide a plurality of substantially radial slots, and said other member having a plurality of substantially radial slots aligned with the first mentioned slots, and a plurality of spring bars each engaged at one end in a slot of said rim and at the other end in a slot of said other member, all of said slots having surved walls constituting cam surfaces cooperating with said spring bars, said rim being spaced from said other member to allow a predetermined amount of misalignment between said members, and said spring bars being clamped between portions of the curved walls of the slots of one member, but free to move in the slots of the other, whereby said bars may distort freely in cooperation with said cam surfaces, but will return to the desired relation to said slots upon abatement of the distorting force.

6. In a flexible coupling the combination of a driving member and a driven member, said members being juxtaposed and one of said members having a series of blocks fixed therewith and constituting an annular encircling the periphery of the other member, said blocks spaced to provide a plurality of generally radial slots having cam shaped walls disposed in the direction of rotation of said members, and said other member having a plurality of generally radial slots substantially aligned with the first mentioned slots, and also having cam shaped walls disposed in the direction of rotation of said members, and a plurality of spring bars each engaged at one end in a slot of said rim, and at the other end in a slot in said other member in rigidly clamped engagement with portions of the cam-shaped walls of said slot, said rim being spaced from said other member to permit a predetermined amount of misalignment between said members, and said cam shaped walls being so configured as to progressively shorten the unsupported length of said bars in accordance with the distortion thereof resulting from the application of a turning moment to one of said members and a resistance to the other, and to cause the resistance of said bars to distortion to approach as a limit the resistance to shearing of said bars.

7. In a flexible coupling the combination of driven and driving members, one of said members providing a plurality of cavities peripherally disposed therein, and torque transmitting elements fixed in said cavities including pairs of blocks and resilient elements between said blocks and extending into engagement with the other member, said blocks being forced by engagement with the walls of said cavities into clamping engagement with said resilient elements.

8. In a coupling device the combination of a pair of juxtaposed spaced disks, one connected to a driving shaft, and the other connected to a driven shaft, and a series of blocks on one disk substantially encircling the periphery of the other disk, said blocks being detachably fixed with said disk, and elements extending from the other disk and engaged with said blocks to form a driving connection between said disks, said blocks being replaceable with others of different size to permit different axial spacings between said disks.

9. In a flexible coupling the combination of driven and driving members, one of said members providing a plurality of cavities peripherally disposed therein, and torque transmitting elements fixed in said cavities including pairs of blocks and resilient elements between said blocks and extending into engagement with the other member, said blocks being forced by engagement with the walls of said cavities into clamping engagement with said resilient elements, and the surfaces of said blocks in contact with said resilient elements being extended to form cam surfaces against which said elements are supported when deformed under load.

10. In a flexible coupling, the combination of a driving member and a driven member, one of said members being provided with substantially radial slots, a group of leaf springs clamped at one end in each slot, the other member being also provided with substantially radial slots radially spaced from the first mentioned slots, said groups of springs being engaged at their other ends in the second mentioned slots, the first mentioned slots being arranged with surfaces flaring from the point of clamp engagement with said spring leaves toward the other member to provide surfaces against which said springs may bear as they flex under load to progressively shorten the unsupported length thereof, and the second mentioned slots flaring toward the first mentioned member, so as to leave a substantial length of said spring leaves unsupported when at rest, but to avoid concentrated loads or sharp bends in said leaves when under load.

11. In a coupling device the combination of a pair of juxtaposed spaced disks, one connected to a driving shaft, and the other connected to a driven shaft, and a series of blocks on one disk substantially encircling the periphery of the other disk, said blocks being detachably fixed with said disk and having cam surfaces spaced apart to form a series of slots disposed about the periphery of the second mentioned disk, and driving elements extending from the other disk and engaged in said slots to form a driving connection between said disks, said blocks being replaceable with others of different size to permit different axial spacings between said disks.

12. In a flexible coupling the combination of driven and driving members, one of said members providing a plurality of cavities peripherally disposed therein, and torque transmitting elements fixed in said cavities including pairs of blocks and resilient elements between said blocks and extending into engagement with the other member, said blocks being forced by engagement with the walls of said cavities into clamping engagement with said resilient elements, and the surfaces of said blocks in contact with said resilient elements being extended to form cam surfaces against which said elements are supported, and shaped so as to limit the flexing of said elements, when deformed under load, to a predetermined amount.

JOHN LEONARD TAYLOR.